US008730635B2

United States Patent
Takahashi et al.

(10) Patent No.: US 8,730,635 B2
(45) Date of Patent: May 20, 2014

(54) POWER SUPPLY CONTROLLER

(75) Inventors: Seiji Takahashi, Yokkaichi (JP); Yutaka Higuchi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/392,243

(22) PCT Filed: Sep. 24, 2010

(86) PCT No.: PCT/JP2010/066584
§ 371 (c)(1),
(2), (4) Date: Feb. 24, 2012

(87) PCT Pub. No.: WO2011/037200
PCT Pub. Date: Mar. 31, 2011

(65) Prior Publication Data
US 2012/0146614 A1 Jun. 14, 2012

(30) Foreign Application Priority Data
Sep. 25, 2009 (JP) .................................. 2009-221519

(51) Int. Cl.
*H02H 5/04* (2006.01)

(52) U.S. Cl.
USPC ........................................................ 361/93.8

(58) Field of Classification Search
USPC ........................................................ 361/93.8
See application file for complete search history.

(56) References Cited

U.S. PATENT DOCUMENTS

| 8,089,742 B2 | 1/2012 | Ohshima |
| 2010/0118461 A1 | 5/2010 | Ohshima |

FOREIGN PATENT DOCUMENTS

| JP | A-48-16149 | 3/1973 |
| JP | A-2000-315588 | 11/2000 |
| JP | A-2003-299241 | 10/2003 |
| JP | A-2008-263278 | 10/2008 |

OTHER PUBLICATIONS

International Search Report issued in International Application No. PCT/JP2010/066584 dated Dec. 7, 2010 (with translation).
Written Opinion issued in International Application No. PCT/JP2010/066584 dated Dec. 7, 2010 (with translation).
Chinese Office Action dated Dec. 25, 2013 from Chinese Patent Application No. 201080042178.2 (with English-language translation).
Notification of Reasons for Refusal dated Feb. 13, 2014 from Japanese Patent Application No. 2013-051449 (with English-language translation).

*Primary Examiner* — Jared Fureman
*Assistant Examiner* — Nicholas Ieva
(74) *Attorney, Agent, or Firm* — Oliff PLC

(57) ABSTRACT

If a power supply path is in an abnormal state, a power-supply-path protection circuit of a power supply controller inhibits a switching circuit that switches on/off power supply from a power source to a load from power supply, using data related to a protection-current temperature characteristic line set by a characteristic setting circuit. The protection-current temperature characteristic line has a characteristic in which a protection current value is constant corresponding to increase in an ambient temperature or a negative characteristic in which the protection current value reduces corresponding to increase in the ambient temperature. Within a temperature range equal to or lower than an supposed maximum ambient temperature around the power-supply-path, the protection-current temperature characteristic line and a power-supply-path temperature characteristic line have a relation that the protection-current value is equal to or lower than an allowable current value at an identical ambient temperature.

9 Claims, 5 Drawing Sheets

POWER SUPPLY CONTROLLER

TECHNICAL FIELD

The present invention relates to power supply controllers. In particular, the present invention relates to shutting off power supply to a load using a semiconductor element as a fuse.

BACKGROUND ART

A conventional power supply controller includes a high-power semiconductor switch element (such as a power MOSFET) to be provided in a power supply path between a power source and a load. The power supply controller controls current supply to the load by turning on and off the semiconductor switch element. Furthermore, the power supply controller uses the semiconductor switch element in place of a mechanical current fuse as a fuse for protecting the power supply path to the load from overcurrent etc. If overcurrent passes, the power supply controller controls potential at a control terminal of the semiconductor switch element using a control circuit so as to turn off the semiconductor switch element, thereby shutting off power supply (see Patent Document 1).
(Patent Document 1) Japanese Unexamined Patent Application Publication No. 2000-315588

DISCLOSURE OF THE INVENTION

Problem to Be Solved by the Invention

Generally, in a case where a mechanical current fuse is used to protect a power supply path, the mechanical current fuse has a fusing characteristic corresponding to the ambient temperature. For example, the fusing characteristic is set higher if the ambient temperature is lower, while the fusing characteristic is set lower if the ambient temperature is higher. Furthermore, because the ambient temperature around the thermal fuse may differ from the ambient temperature around the power supply path, the fusing characteristic of the thermal fuse is set with a margin considering a difference between the ambient temperatures. Therefore, the semiconductor switch element used as a fuse also is required for the fusing characteristic (melting characteristic) with a margin similar to that of the thermal fuse. However, if a temperature sensor is provided in each power supply path to detect the difference between the ambient temperatures, the parts count of the device is increased. In order to avoid this inconvenience, a power supply controller with an uncomplicated configuration while having a protection range similar to that of the mechanical current fuse has been required.

Means for Solving the Problem

The present invention was achieved in view of the foregoing circumstances. A power supply controller according to the present invention is to be connected to a power supply path for supplying power from a power source to a load. The power supply controller is configured to control power supply from the power source to the load and includes: a switching circuit to be provided between the power source and the power supply path, the switching circuit being configured to switch power supply from the power source to the load between on and off; a power-supply-path protection circuit configured to control switching of the switching circuit according to a power supply command signal that commands to start or terminate the power supply to the load and, if the power supply path is in an abnormal state, inhibit the switching circuit from the power supply, thereby protecting the power supply path; and a characteristic setting circuit configured to set a characteristic of a protection-current temperature characteristic line. The protection-current temperature characteristic line is for the power-supply-path protection circuit to inhibit the switching circuit from the power supply. The protection-current temperature characteristic line represents a relation between a protection-current value at which the power supply is inhibited and an ambient temperature. The protection-current temperature characteristic line has a characteristic in which the protection-current value is constant corresponding to increase in the ambient temperature or a negative characteristic in which the protection-current value reduces corresponding to increase in the ambient temperature. The protection-current temperature characteristic line and a power-supply-path temperature characteristic line have a relation that the protection-current value is equal to or lower than an allowable current value of the power supply path at an identical ambient temperature within a temperature range equal to or lower than a supposed maximum ambient temperature around the power supply path. The power-supply-path temperature characteristic line represents a relation between the allowable current value of the power supply path and an ambient temperature.

According to the above configuration, the characteristic setting circuit sets the protection-current temperature characteristic line. Therefore, a temperature characteristic at least similar to a temperature characteristic of a conventional mechanical current fuse can be achieved with a semiconductor fuse having a semiconductor switch as the switching circuit. Therefore, similar to the conventional mechanical current fuse, the shutting-off characteristic can be increased at lower ambient temperature so as to correspond to increase in the load current under low temperature, while the shutting-off characteristic can be reduced at higher ambient temperature so that performance decline of the power supply path under high temperature is avoided. In addition, the fuse box for the fuse can be smaller. Furthermore, a margin for a difference in temperature between the power supply path and the fuse box can be maintained similar to that of the conventional fuse.

EXPLANATION OF SYMBOLS

Figure 1:
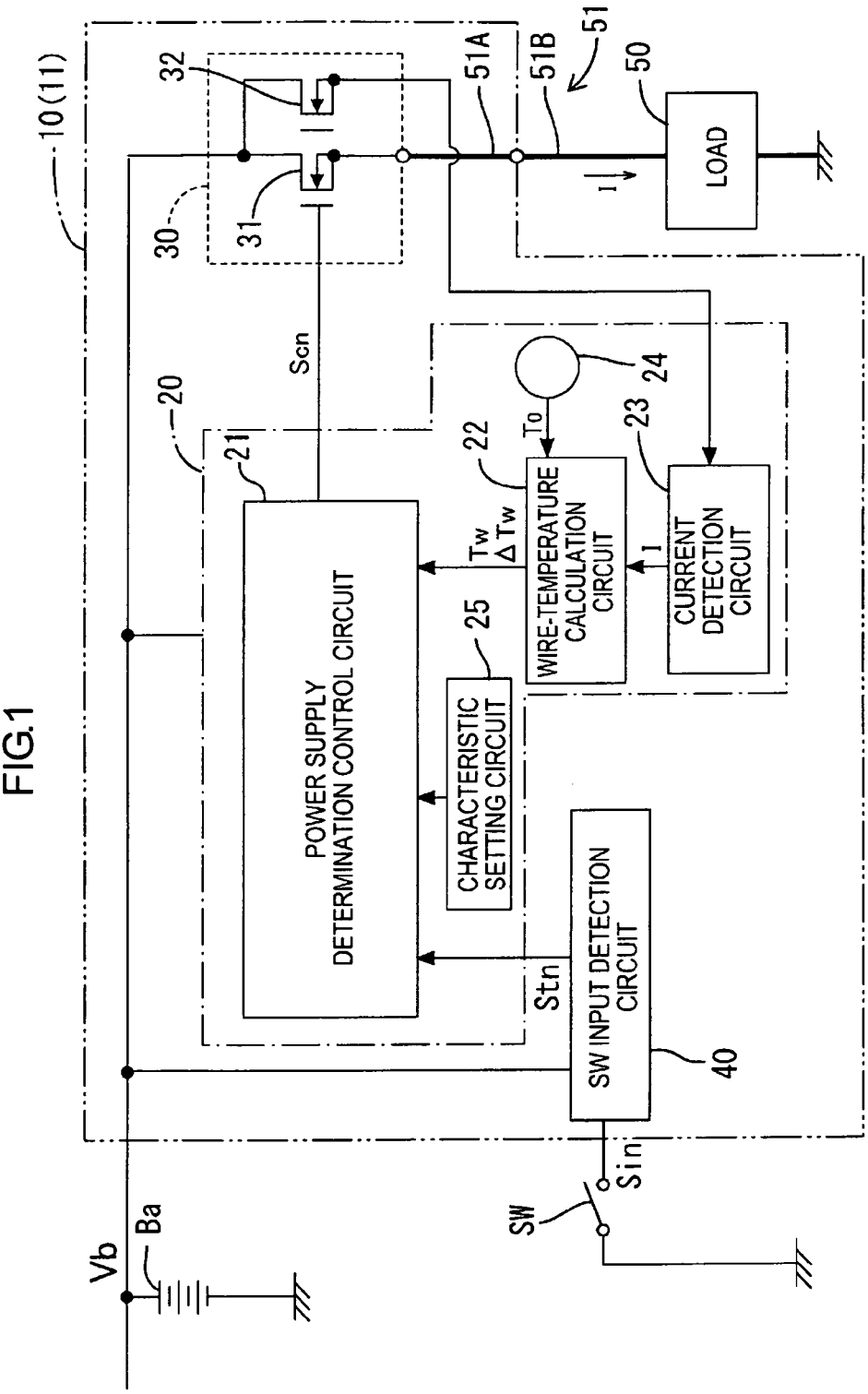
FIG. 1 illustrates a schematic block diagram of a power supply controller of embodiments according to the present invention.

10 ... Power supply controller
11 ... printed circuit board
20 ... power-supply-path protection circuit
21 ... power supply determination control circuit
22 ... wire-temperature calculation circuit
23 ... current detection circuit (current detecting portion)

24 . . . ambient temperature sensor (temperature detection circuit)
25 . . . characteristic setting circuit
30 . . . switching circuit
31 . . . main switch (switching circuit)
32 . . . sense transistor (current detecting portion)
50 . . . fan motor (load)
51 . . . power supply path
51A . . . printed wiring portion (power supply path)
51B . . . wire portion (power supply path)
I . . . flowing current
Lpr . . . protection-current temperature characteristic line Lpr
Lw . . . wire characteristic line (power-supply-path temperature characteristic line)
$T_0vi$ . . . hypothetical ambient temperature, hypothetical ambient temperature function

BEST MODE FOR CARRYING OUT THE INVENTION

<First Embodiment>

A first embodiment according to the present invention will be described with reference to FIGS. 1 through 3. FIG. 1 illustrates a schematic diagram of a power supply controller 10 of the first embodiment according to the present invention.

1. Circuit Configuration

As illustrated in FIG. 1, the power supply controller 10 is connected to a power supply path 51 between a power source Ba and a load 50. The power supply path 51 supplies electric power from the power source Ba to the load 50. The power supply controller 10 controls the power supply from the power source Ba to the load 50.

The power supply controller 10 includes a power-supply-path protection circuit 20, a switching circuit 30, and a switch (SW) input detection circuit 40. The power supply controller 10 is formed on a printed circuit board 11. The power supply path 51 includes a printed wiring portion 51A and a wire portion (hereinafter referred to simply as a "wire") 51B. The printed wiring portion 51A is formed on the printed circuit board 11. The wire 51B connects the printed wiring portion 51A and the load 50.

In the embodiment 1, the power supply controller 10 is disposed illustratively in an automotive engine room. The power source Ba is a battery. As the load 50, a fan motor illustrated. The power supply controller 10 drive-controls the fan motor via the power supply path 51. The switching circuit 30 directly receives battery voltage Vb, as illustrated in FIG. 1. On the other hand, the power-supply-path protection circuit 20 and the SW input detection circuit 40 receive the battery voltage Vb converted into a predetermined voltage via a voltage converter (not shown).

The power supply controller according to the present invention is not limited to the power supply controller 10 of the first embodiment. The present invention is applicable to any power supply controller used both for controlling power supply to a load and for protecting a power supply path. In addition, the load is not limited to the motor.

The SW input detection circuit 40 is connected to an input switch SW. When the input switch SW is turned on, the SW input detection circuit 40 receives an input signal (a power supply command signal) Sin that commands to start power supply to the load 50. According to the input signal Sin, the SW input detection circuit 40 generates an output command signal (a power supply command signal) Stn. In other words, in this embodiment, start of power supply to the load 50 is commanded by turning on the input switch SW.

On the other hand, when the input switch SW is turned off, the SW input detection circuit 40 receives the input signal Sin that commands to terminate power supply to the load 50.

The switching circuit 30 is provided between the battery Ba and the power supply path 51. The switching circuit 30 switches power supply from the battery Ba to the load 50 between on and off according to a power supply control signal Scn from the power-supply-path protection circuit 20. The switching circuit 30 is configured as a semiconductor switch, including a main switch 31 and a sense transistor (current detection means) 32. The main switch 31 supplies power to the load 50. The sense transistor 32 is provided for detecting a load current (flowing current) I. Each of the main switch 31 and the sense transistor 32 is configured by, for example, an N-channel FET (field effect transistor) as illustrated in FIG. 1.

The power-supply-path protection circuit 20 includes a power supply determination control circuit 21, a wire-temperature calculation circuit 22, a current detecting portion, an ambient temperature sensor (an ambient-temperature detection circuit) 24, and a characteristic setting circuit 25. The power-supply-path protection circuit 20 controls switching of the switching circuit 30 according to the power supply command signal Stn that commands to start or terminate power supply to the load 50. Furthermore, if the power supply path 51 is in an abnormal state, the power-supply-path protection circuit 20 inhibits the switching circuit 30 from power supply, thereby protecting the power supply path 51. As described later, the power-supply-path protection circuit 20 inhibits the switching circuit 30 from power supply if a power-supply-path temperature increase value ΔTw from an ambient temperature $T_0$ exceeds an allowable power-supply-path temperature increase value ΔTwmax. The power-supply-path temperature increase value ΔTw is calculated from the flowing current I, a resistance of the power supply path 51, and a heat radiation characteristic of the power supply path 51. The allowable power-supply-path temperature increase value ΔTwmax is calculated from the ambient temperature $T_0$ and a maximum power-supply-path temperature Twmax.

The power-supply-path protection circuit 20 protects at least one of the printed wiring portion 51A and the wire 51B. In this embodiment, the wire 51B is protected. The present invention is not limited to this. For example, the power-supply-path protection circuit 20 may protect the printed wiring portion 51A. Furthermore, both the printed wiring portion 51A and the wire 51B may be protected.

The characteristic setting circuit 25 sets control data required for the power-supply-path protection circuit 20 to control the switching circuit 30. For example, the characteristic setting circuit 25 sets the control data by storing data in a nonvolatile memory. The data is related to a protection-current temperature characteristic line Lpr for the power-supply-path protection circuit 20 to inhibit the switching circuit 30 from power supply. The protection-current temperature characteristic line Lpr represents a relation between a protection-current value at which power supply is inhibited and the ambient temperature $T_0$. The protection-current temperature characteristic line Lpr has a characteristic in which the protection-current value is constant corresponding to increase in the ambient temperature $T_0$ or a negative characteristic in which the protection-current value reduces corresponding to increase in the ambient temperature $T_0$. Furthermore, in the first embodiment, within a temperature range equal to or lower than the supposed maximum ambient temperature $T_0$sumax around the power supply path 51, the protection-current temperature characteristic line Lpr and a power-supply-path temperature characteristic line Lwc have a relation that the protection-current value is equal to or lower than the allowable current value in an identical ambient temperature (see FIG. 3). The power-supply-path temperature characteristic line (a wire characteristic line) Lwc indicates a relation between a power-supply-path allowable current value and an ambient temperature.

The current detecting portion includes a current detection circuit 23 and the sense transistor 32. The current detecting portion detects the load current I passing through the wire 51B via the switching circuit 30. The sense transistor 32 detects a sense current. The current detection circuit 23 multiplies the sense current by a predetermined number to convert the sense current into the load current (flowing current) I. The information on the flowing current I is provided to the wire-temperature calculation circuit 22.

The ambient temperature sensor 24 is disposed close to the wire-temperature calculation circuit 22. The ambient temperature sensor 24 detects the ambient temperature $T_0$ around the power supply controller 10. In this embodiment, the ambient temperature sensor 24 detects the ambient temperature $T_0$ in the automotive engine room. The information on the detected ambient temperature $T_0$ is provided to the wire-temperature calculation circuit 22. The ambient temperature $T_0$ is not limited to the engine-room temperature.

Based on a difference between generated heat in the wire 51B by the flowing current I and radiant heat from the wire 51B, the wire-temperature calculation circuit 22 calculate-estimates the wire-temperature increase value $\Delta Tw$ from the ambient temperature $T_0$. Next, the wire-temperature calculation circuit 22 adds the calculated wire-temperature increase value $\Delta Tw$ to the ambient temperature $T_0$, thereby calculating a wire temperature Tw. The wire-temperature calculation circuit 22 provides the information on the calculated wire-temperature increase value $\Delta Tw$ and the information on the calculated wire temperature Tw to the power supply determination control circuit 21. In the first embodiment, an hypothetical ambient temperature $T_0vi$ is used as the ambient temperature $T_0$. This will be described later.

Specifically, the wire-temperature calculation circuit 22 samples the flowing current I in, for example, each predetermined time $\Delta t$ and substitutes each value of the flowing current I in formula (1) as below, thereby calculating the wire-temperature increase value $\Delta Tw$. The wire-temperature calculation circuit 22 calculates the wire-temperature increase value $\Delta Tw$ according to, for example, a predetermined calculation program stored in a nonvolatile memory such as a ROM.

$$\Delta Tw(n)=\Delta Tw(N-1)\times\exp(-\Delta t/\tau w)+Rthw\times Rw(n-1)\times I(n-1)^2\times(1-\exp(-\Delta t/\tau w)) \quad \text{formula (1)}$$

where:

I(n): detected current value (A) in an n-th detection (n is an integer equal to or greater than 1 (one));

$\Delta Tw$ (n) is a wire-temperature increase (° C.) detected in the n-th detection;

$Rw(n)=Rw(0)\times(1+\kappa w\times(Tw-Tb))$ is a wire resistance ($\Omega$) in the n-th detection;

Rw(0): wire resistance ($\Omega$) at a predetermined reference temperature Tb;

Rthw: thermal resistance of the wire (° C./W);

$\tau w$: thermal time constant of the wire (s); and $\kappa w$: resistance temperature coefficient of the wire (/° C.).

In formula (1), the first term does not contain the flowing current I. The first term gives the radiant heat from the wire 51B. The second term contains the flowing current I. The second term gives the generated heat in the wire 51B due to the flowing current I. In other words, when the power supply to the load 50 is shut off and no flowing current I is passing, the wire temperature Tw is decided by the radiant heat from the wire 51B.

The power supply determination control circuit 21 controls power supply of the switching circuit 30 between on and off according to the power supply command signal Stn from the SW input detection circuit 40. Furthermore, if the wire temperature Tw reaches the predetermined maximum wire temperature Twmax, the power supply determination control circuit 21 turns off the switching circuit 30. In this embodiment, the maximum wire (power supply path) temperature Twmax is set at a wire smoking temperature. That is, if the wire temperature Tw reaches the wire smoking temperature Twmax, the power supply determination control circuit 21 turns off the main switch 31 of the switching circuit 30 to inhibit the switching circuit 30 from power supply to the load 50, thereby protecting the wire 51B.

In other words, the power-supply-path temperature increase value $\Delta Tw$ from the ambient temperature $T_0$ is calculated from the flowing current I, the resistance Rw of the power supply path 51, and the heat radiation characteristic $\tau w$. On the other hand, the allowable power-supply-path temperature increase value $\Delta Twmax$ is calculated from the ambient temperature $T_0$ and the maximum wire temperature Twmax. If the power-supply-path temperature increase value $\Delta Tw$ exceeds the allowable power-supply-path temperature increase value $\Delta Twmax$, the power supply determination control circuit 21 inhibits the switching circuit 30 from power supply. Because of this, the wire 51B is suitably protected from smoking, while its power supply is allowed close to the smoking temperature Twmax.

2. Method of Adjusting Protection-Current Temperature Characteristic Line

A method of adjusting the protection-current temperature characteristic line of the first embodiment will hereinafter be described with reference to FIGS. 2 and 3. FIG. 2 illustrates a graph indicating the allowable power-supply-path temperature increase value of the first embodiment. FIG. 3 illustrates a graph of protection-current temperature characteristic lines of the first embodiment. A hatched area in FIG. 3 indicates a protection range PR.

In the first embodiment, the allowable power-supply-path temperature increase value $\Delta Twmax$ is calculated using a following formula:

$$\Delta Twmax=Twmax-(a*T_0+b)$$

where:

Twmax is the maximum power-supply-path temperature;

$(a*T_0+b)$ is the hypothetical ambient temperature $T_0vi$;

$T_0$ is the ambient temperature;

"a" is a coefficient; and

"b" is a constant.

The constant "b" is set at a value such that the hypothetical ambient temperature $T_0vi$ $(=a*T_0+b)$ takes a value equal to the supposed maximum ambient temperature $T_0sumax$ at the supposed maximum ambient temperature $T_0sumax$. In FIG. 2, the supposed maximum ambient temperature $T_0sumax$ and the maximum power-supply-path temperature Twmax are illustratively 80° C. and 165° C., respectively.

In the first embodiment, the protection-current temperature characteristic line Lpr is adjusted by changing the coefficient "a" and the constant "b" of the hypothetical ambient temperature $T_0vi$ represented by the linear function of the ambient temperature $T_0$. In addition, due to the condition of the constant "b", the graph of the hypothetical ambient temperature $T_0vi$ (the linear function) necessarily passes coordinates $(T_0sumax, T_0sumax)$ as illustrated in FIG. 2. Different settings of the protection-current temperature characteristic line Lpr are obtained with different settings of the coefficient "a" and the constant "b". This will hereinafter be described.

2-1. In a case of "0<a<1"

Figure 2:
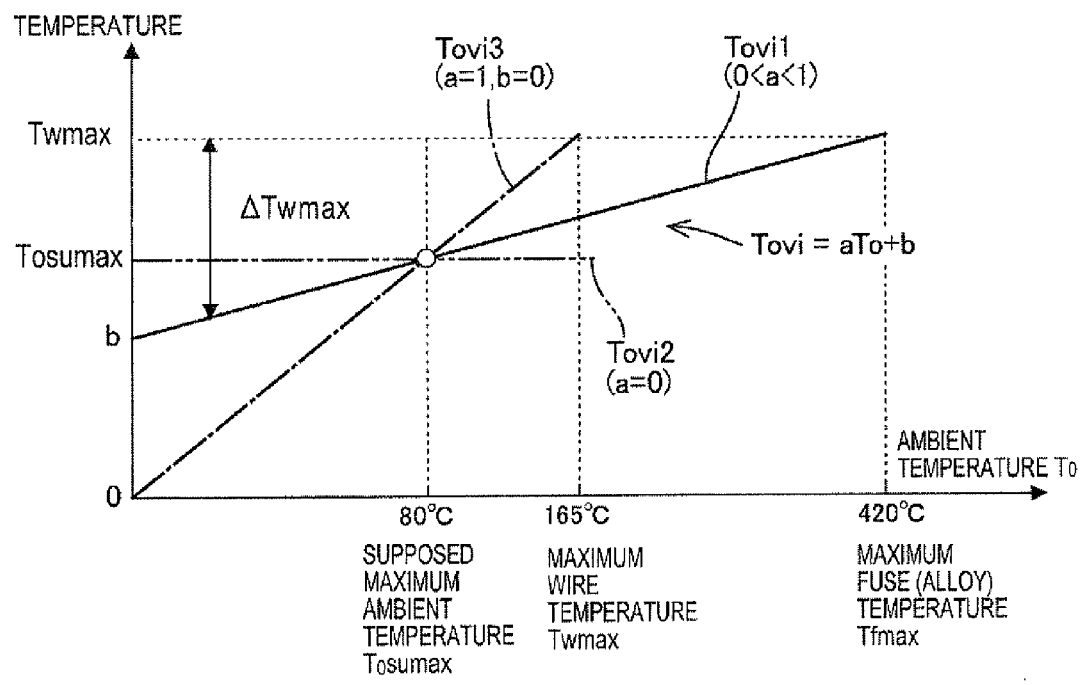
FIG. 2 illustrates a graph indicating an allowable power-supply-path temperature increase value of a first embodiment.
Figure 3:
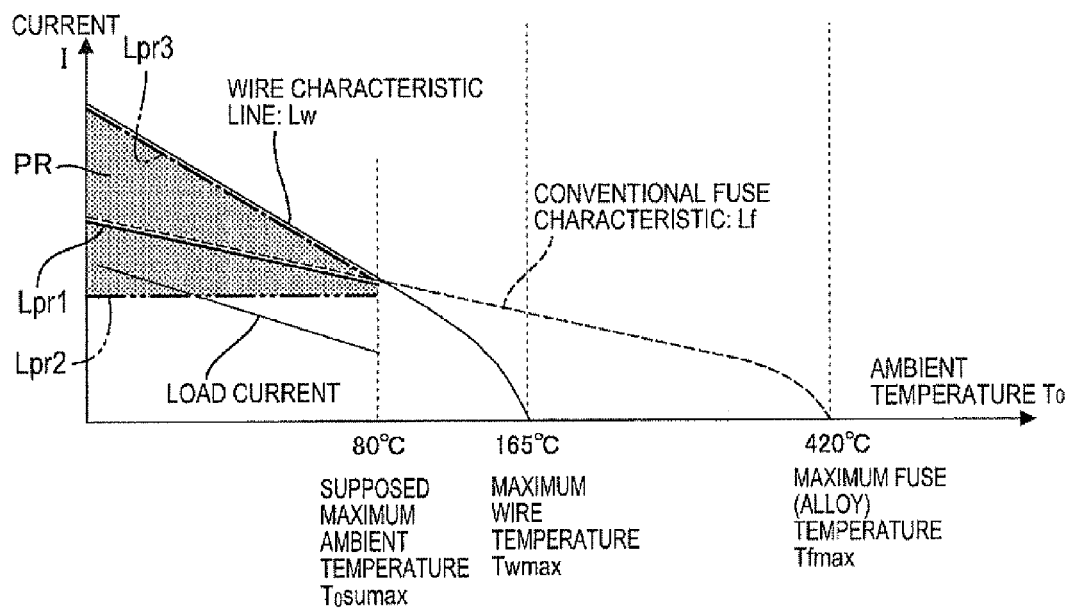
FIG. 3 illustrates a graph of a protection-current temperature characteristic line of the first embodiment.

The hypothetical ambient temperature $T_0vi$ with the coefficient "a" set within a range of 0<a<1 is illustrated by solid straight line $T_0vi1$ in FIG. 2. In this case, with the coefficient "a" set at a predetermined value within the range of 0<a<1, the protection-current temperature characteristic line Lpr can be set as illustrated by solid line (protection-current temperature characteristic line Lpr1) in FIG. 3. Within a temperature range equal to or lower than the supposed maximum ambient temperature $T_0$sumax, the protection-current temperature characteristic line Lpr1 is similar to a conventional mechanical current fuse characteristic line Lf. Accordingly, for example, with the coefficient "a" set at 0.25 and the constant "b" set at 60, the protection range similar to the conventional mechanical current fuse is obtained.

2-2. In a case of "a=0"

The hypothetical ambient temperature $T_0vi$ with the coefficient "a" set at zero is illustrated by dashed-two-dotted straight line $T_0vi2$ in FIG. 2. The constant "b" is equal to the supposed maximum ambient temperature $T_0$sumax then. In this case, the protection-current temperature characteristic line Lpr is set as illustrated by dashed-two-dotted line (protection-current temperature characteristic line Lpr2) in FIG. 3. Within the temperature range equal to or lower than the supposed maximum ambient temperature $T_0$sumax, the protection-current temperature characteristic line Lpr2 is constant, being independent of the ambient temperature. Therefore, the wire 51B is reliably protected at any supposed ambient temperature $T_0$. For example, even if the power supply controller 10 is placed at a supposed minimum temperature while the wire (power supply path) 51B being placed at a supposed maximum temperature, the wire 51B is reliably protected. In comparison to this, the fusing (melting) current of the conventional mechanical current fuse physically varies depending on the temperature; therefore, the protection-current temperature characteristic line Lpr 2 cannot be achieved with the conventional mechanical current fuse.

In this case, if the temperature increase value ΔTw exceeds the allowable power-supply-path temperature increase value ΔTwmax (that is decided from the maximum ambient temperature around the wire (the power supply path) 51B or the supposed maximum ambient temperature $T_0$sumax and the maximum temperature Twmax of the wire 51B) of the wire 51B, the power-supply-path protection circuit 20 inhibits the switching circuit 30 from power supply, thereby protecting the wire 51B.

2-3. In a case of "a=1"

The hypothetical ambient temperature $T_0vi$ with the value of the coefficient "a" set at 1 (one) is illustrated by dashed-dotted straight line $T_0vi3$ in FIG. 2. In this case, due to the condition of setting the constant "b", the constant "b" takes a value of zero. In this case, the protection-current temperature characteristic line Lpr is set as illustrated by the dashed-dotted line (hypothetical ambient temperature $T_0vi3$). Within the temperature range equal to or lower than the supposed maximum ambient temperature $T_0$sumax, the hypothetical ambient temperature $T_0vi3$ extends along the power-supply-path temperature characteristic line Lw, i.e. is substantially identical with the power-supply-path temperature characteristic line Lw. Therefore, in a case where, for example, the power supply controller 10 and the wire (power supply path) 51B are placed at an identical ambient temperature $T_0$, the wire 51B is reliably protected at any supposed ambient temperature $T_0$. Furthermore, while a power supply limit of the wire 51B generally varies depending on the ambient temperature $T_0$, the wire 51B can supply power up to the power supply limit at any ambient temperature $T_0$. Therefore, extra margin of the wire 51B is unnecessary, so that the wire 51B can be downsized (finer). In comparison to this, the conventional mechanical current fuse has an individual and physical temperature characteristic of fusing current; therefore, the protection-current temperature characteristic line Lpr3 cannot be achieved with the conventional mechanical current fuse.

In this case, if the temperature increase value ΔTw exceeds the allowable power-supply-path temperature increase value ΔTwmax (that is decided from the ambient temperature $T_0$ of the wire (power supply path) 51B and the maximum power-supply-path temperature Twmax) of the wire 51B, the power-supply-path protection circuit 20 inhibits the switching circuit from power supply, thereby protecting the wire 51B. This case corresponds to a case where the allowable power-supply-path temperature increase value ΔTwmax is calculated using an actual ambient temperature $T_0$ (a fixed value).

In the first embodiment, the wire-temperature calculation circuit 22 calculates the allowable power-supply-path temperature increase value ΔTwmax according to, for example, a predetermined calculation program stored in a nonvolatile memory such as a ROM. The values of the coefficient "a" and the constant "b" are decided corresponding to the power supply path 51 to be protected by experiments etc. in advance, and are stored in a nonvolatile memory such as a ROM. The ambient temperature $T_0$ is obtained from the ambient temperature sensor 24 as the necessity arises. In the case of, for example, the above (2-2.1, obtaining the ambient temperature $T_0$ is unnecessary. In addition, it may be the characteristic setting circuit 25 that calculates the allowable power-supply-path temperature increase value ΔTwmax. The characteristic setting circuit 25 sets the protection-current temperature characteristic line (Lpr1 to Lpr3) based on calculation data such as the allowable power-supply-path temperature increase value ΔTwmax etc.

3. Effects of Embodiment 1

As described above, with the coefficient "a" and the constant "b" both properly set, the hypothetical ambient temperature line $T_0vi$ represented by the linear function can be varied such that the protection range is set appropriately such as follows, for example. With the coefficient "a" closer to 1 (one), the protection-current temperature characteristic Lpr is set so as to extend along the power-supply-path temperature characteristic line (wire characteristic line) Lw representing the relation between the allowable current value of the power supply path 51 and the ambient temperature. With the coefficient "a" set to be smaller, the protection-current temperature characteristic Lpr is set so as to be gradual. In other words, the protection-current temperature characteristic line Lpr can be set appropriately. Furthermore, within the temperature range equal to or lower than the supposed maximum ambient temperature $T_0$sumax around the power supply path, the protection-current temperature characteristic line Lpr is equal to or lower than the power-supply-path temperature characteristic line representing the relation between the allowable power-supply-path current value and the ambient temperature. Because of this, the power supply path is properly protected at any ambient temperature within the supposed range. Therefore, the protection range at least similar to the conventional mechanical current fuse can be achieved.

Furthermore, the protection-current temperature characteristic line (such as the protection-current temperature characteristic lines Lpr2 and Lpr3) that cannot be achieved with the mechanical current fuse can be set. That is, the protection range equal to or wider than that of the conventional mechanical current fuse can be achieved.

<Second Embodiment>

Figure 4:
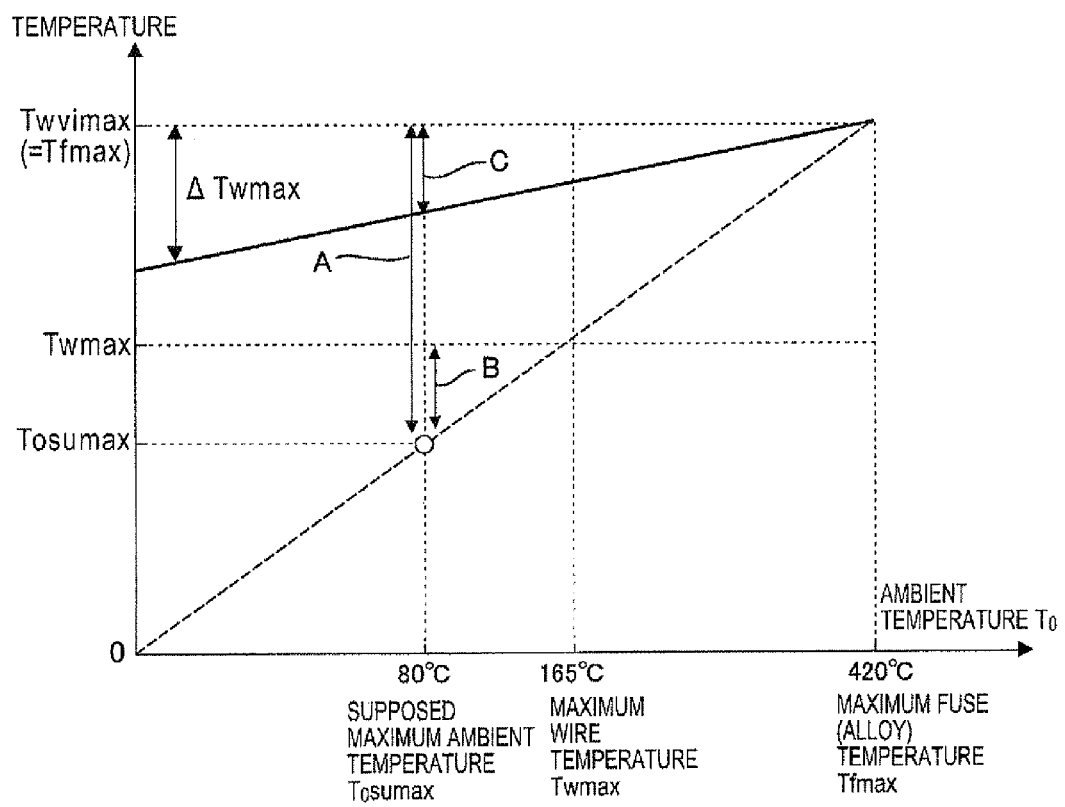
FIG. 4 illustrates a graph indicating an allowable power-supply-path temperature increase value of a second embodiment.
Figure 5:
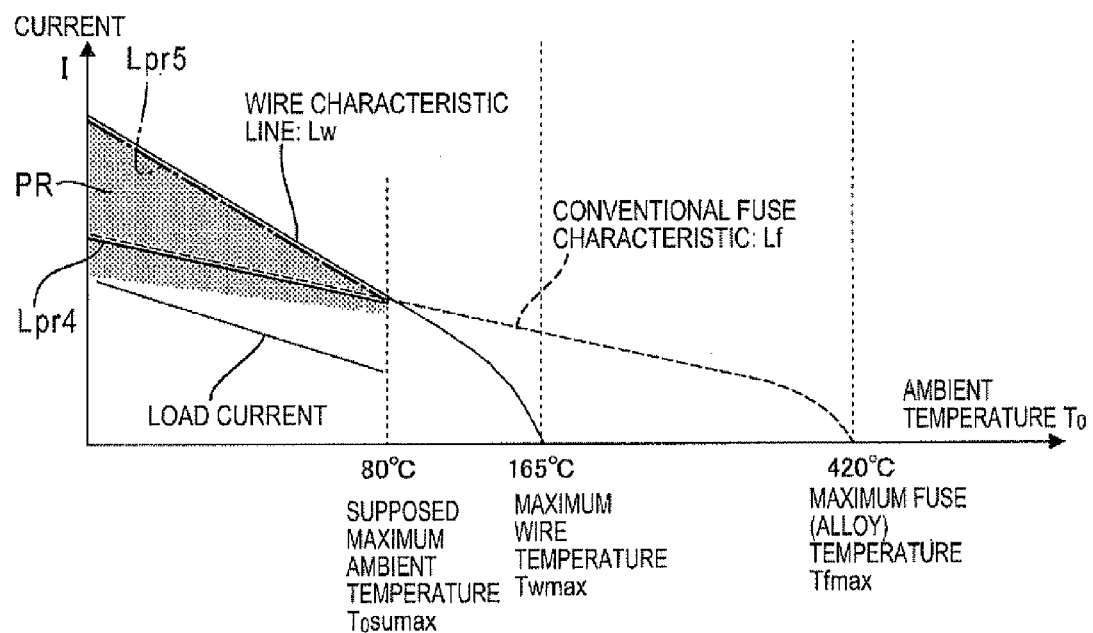
FIG. 5 illustrates a graph of a protection-current temperature characteristic line of the second embodiment.

A method of adjusting the protection-current temperature characteristic line of a second embodiment will hereinafter be described with reference to FIGS. 4 and 5. FIG. 4 illustrates a graph indicating the allowable power-supply-path temperature increase value of the second embodiment. FIG. 5 illustrates a graph of the allowable protection-current temperature characteristic line of the second embodiment. The second embodiment differs from the first embodiment only in the method of calculating the allowable power-supply-path temperature increase value $\Delta Twmax$. The other configurations of the second embodiment are identical with those of the first embodiment.

In the second embodiment, the allowable power-supply-path temperature increase value $\Delta Twmax$ is calculated using a following formula:

$$\Delta Twmax = (Twvimax - T_0) * c$$

where:

Twvimax is a hypothetical maximum power-supply-path temperature; and

"c" is a positive coefficient.

The hypothetical maximum power-supply-path temperature Twvimax is a temperature higher than the maximum power-supply-path temperature Twmax. The coefficient "c" is set such that a following formula is satisfied at the supposed maximum ambient temperature $T_0$sumax:

$$(Twvimax - T_0) * c = [\text{the maximum power-supply-path temperature}] - T_0$$

In other words, a portion indicated by arrow A in FIG. 4 (Twvimax−$T_0$) is multiplied by "c" such that a portion indicated by arrow B ([the maximum power-supply-path temperature]−$T_0$) is equal to a portion indicated by arrow C.

Therefore, with the hypothetical maximum power-supply-path temperature Twvimax and the coefficient "c" both properly set, the protection range can be set appropriately such as follows, for example. With the hypothetical maximum power-supply-path temperature Twvimax set to be lower but not lower than the maximum power-supply-path temperature Twmax and with the coefficient "c" closer to 1 (one), the protection-current temperature characteristic line Lpr can be set so as to extend along the power-supply-path temperature characteristic line Lw representing the relation between the allowable current value of the wire (power supply path) 51B and the ambient temperature $T_0$. With the hypothetical maximum power-supply-path temperature Twvimax set to be higher and with the coefficient set to be smaller, the protection-current temperature characteristic can be set to be gradual. In other words, the protection-current temperature characteristic line Lpr can be set appropriately. Therefore, a protection range at least equal to that of the conventional mechanical current fuse can be achieved.

The hypothetical maximum power-supply-path temperature Twvimax may be set at a fuse melting (maximum) temperature Tfmax (e.g. 420° C.) of a heat generating element of a mechanical current fuse. In this case, a protection-current temperature characteristic line Lpr4 illustrated in FIG. 5 is obtained. The protection-current temperature characteristic line Lpr4 is similar to that of the conventional mechanical current fuse. Therefore, the protection range similar to that of the conventional mechanical current fuse can be achieved. In this case, for example, with the maximum power-supply-path temperature Twmax set at 165° C. and with the ambient temperature $T_0$ set at 80° C., the coefficient "c" takes a following value due to the condition of setting the coefficient "c":

$$c = 0.25 (= (165-80)/(420-80))$$

On the other hand, with the hypothetical maximum power-supply-path temperature Twvimax set at the maximum power-supply-path temperature Twmax and with the value of the coefficient "c" set at 1 (one), a protection-current temperature characteristic line Lpr5 illustrated in FIG. 5 is obtained. The protection-current temperature characteristic line Lpr5 extends along the wire characteristic line Lw. Therefore, the effect similar to that of the case of (2-3. a=1) in the first embodiment can be achieved. In other words, the protection-current temperature characteristic line Lpr5 that cannot be achieved with the conventional mechanical current fuse can be set.

Similar to the first embodiment, the wire-temperature calculation circuit 22 calculates the allowable power-supply-path temperature increase value $\Delta Twmax$ according to, for example, a predetermined calculation program stored in a nonvolatile memory such as a ROM. In the calculation, the value of the coefficient "c" is decided corresponding to the power supply path 51 to be protected by experiments etc. in advance, and is stored in a nonvolatile memory such as a ROM. It may be the characteristic setting circuit 25 that calculates the allowable power-supply-path temperature increase value $\Delta Twmax$. The characteristic setting circuit 25 sets the protection-current temperature characteristic line (Lpr4, Lpr5) based on calculation data such as the allowable power-supply-path temperature increase value $\Delta Twmax$.

4. Effects of Second Embodiment

With the hypothetical maximum power-supply-path temperature Twvimax and the coefficient "c" both properly set, the protection range can be set appropriately such as follows, for example. With the hypothetical maximum power-supply-path temperature Twvimax set to be lower but not lower than the maximum power-supply-path temperature Twmax and with the coefficient "c" closer to 1 (one), the protection-current temperature characteristic line Lpr5 that extends along the power-supply-path temperature characteristic line Lw representing the relation between the allowable current value of the wire (power supply path) 51B and the ambient temperature $T_0$ can be set. With the hypothetical maximum power-supply-path temperature Twvimax set to be higher and with the coefficient "c" set to be smaller, the protection-current temperature characteristic can be set to be gradual. In other words, the protection-current temperature characteristic line Lpr can be set appropriately. Therefore, the protection range at least similar to that of the conventional mechanical current fuse can be achieved.

Furthermore, the protection-current temperature characteristic line that cannot be achieved with the mechanical current fuse can be set, such as the protection-current temperature characteristic line Lpr5. In other words, the protection range equal to or wider than that of the conventional mechanical current fuse can be achieved.

<Other Embodiments>

The present invention is not limited to the embodiments described as above with reference to the drawings. For example, following embodiments also are included within the technical scope of the present invention.

(1) In the above embodiments, the current detecting means are configured illustratively by the current detection circuit 23 and the sense transistor 32. The present invention is not limited to this. The flowing current can be detected using a shunt resistor or based on a drain-source voltage Vds of a main switch (N-channel FET).

(2) In the above-described embodiments, the circuits in the power supply controller 10 are configured as individual circuits. The present invention is not limited to this. For example, the power-supply-path protection circuit 20 (excepting the ambient temperature sensor 24) and the SW input detection circuit 40 may be configured by an ASIC (application specific integrated circuit).

The invention claimed is:

1. A power supply controller connected to a power supply path for supplying power from a power source to a load, the power supply controller controlling power supply from the power source to the load, and the power supply controller comprising:
   a switching circuit provided between the power source and the power supply path, the switching circuit switching the power supply from the power source to the load between on and off;
   a power-supply-path protection circuit that controls switching operation of the switching circuit according to a power supply command signal that commands to start or terminate the power supply to the load and, if the power supply path is in an abnormal state, inhibit the switching circuit from the power supply, thereby protecting the power supply path, the power-supply-path protection circuit including an ambient-temperature detection circuit and a current detecting circuit, the ambient-temperature detection circuit detecting an ambient temperature around the power supply controller, the current detecting circuit detecting a flowing current in the power supply path; and
   a characteristic setting circuit that sets a characteristic of a protection-current temperature characteristic line, the protection-current temperature characteristic line being for the power-supply-path protection circuit to inhibit the switching circuit from the power supply, the protection-current temperature characteristic line representing a relation between a protection-current value at which the power supply is inhibited and an ambient temperature,
   wherein:
   the protection-current temperature characteristic line has a characteristic in which the protection-current value is constant corresponding to increase in the ambient temperature or a negative characteristic in which the protection-current value reduces corresponding to increase in the ambient temperature,
   the protection-current temperature characteristic line and a power-supply-path temperature characteristic line have a relation that the protection-current value is equal to or lower than an allowable current value of the power supply path at an identical ambient temperature within a temperature range equal to or lower than an supposed maximum ambient temperature around the power supply path, the power-supply-path temperature characteristic line representing a relation between the allowable current value of the power supply path and an ambient temperature, and
   the power-supply-path protection circuit inhibits the power supply to the load by the switching circuit if a temperature increase value of the power supply path from the ambient temperature exceeds an allowable power-supply-path temperature increase value, the temperature increase value being calculated from the flowing current, a resistance of the power supply path, and a heat radiation characteristic of the power supply path, the allowable power-supply-path temperature increase value being calculated from the ambient temperature and a maximum temperature of the power supply path.

2. The power supply controller according to claim 1, wherein:
   the allowable power-supply-path temperature increase value is calculated using a following formula:

$$\Delta Twmax = Twmax - (a*T_0 + b)$$

where $\Delta Twmax$ is the allowable power-supply-path temperature increase value, $Twmax$ is a maximum power-supply-path temperature, $(a*T_0+b)$ is a hypothetical ambient temperature, $T_0$ is an ambient temperature, "a" is a coefficient, and "b" is a constant; and
   the constant "b" is set at a value such that the hypothetical ambient temperature $(a*T_0+b)$ takes a value equal to the supposed maximum ambient temperature at the supposed maximum ambient temperature.

3. The power supply controller according to claim 2, wherein the coefficient "a" is within a range of 0 <a<1.

4. The power supply controller according to claim 2, wherein the coefficient "a" takes a value of zero.

5. The power supply controller according to claim 2, wherein the coefficient "a" takes a value of 1.

6. The power supply controller according to claim 1, wherein:
   the allowable power-supply-path temperature increase value is calculated using a following formula:

$$\Delta Twmax = (Twvimax - T_0)*c$$

where $\Delta Twmax$ is an allowable power-supply-path temperature increase value, $Twvimax$ is a hypothetical maximum power-supply-path temperature, $T_0$ is an ambient temperature, and "c" is a positive coefficient;
   the hypothetical maximum power-supply-path temperature is a temperature higher than the maximum power-supply-path temperature; and
   the coefficient "c" is set such that a following formula is satisfied at a supposed maximum ambient temperature:

$$(Twvimax - T_0)*c = [\text{the maximum power-supply-path temperature}] - T_0.$$

7. The power supply controller according to claim 6, wherein the hypothetical maximum power-supply-path temperature is a fusing temperature of a heat generation element of a mechanical current fuse.

8. The power supply controller according to claim 6, wherein:
   the hypothetical maximum power-supply-path temperature is a maximum power-supply-path temperature; and
   the coefficient "c" takes a value of 1.

9. The power supply controller according to claim 1, wherein:
   the power supply controller is formed on a printed circuit board;
   the power supply path includes a printed wiring portion and a wire portion, the printed wiring portion being formed on the printed circuit board and the wire portion that connects the printed wiring portion and the load; and
   the power-supply-path protection circuit protects at least one of the printed wiring portion and the wire portion.

* * * * *